(12) United States Patent
Yang et al.

(10) Patent No.: US 9,113,310 B2
(45) Date of Patent: Aug. 18, 2015

(54) SYSTEMS AND METHODS FOR SIMULTANEOUSLY AND AUTOMATICALLY CREATING DATABASES OF WIFI SIGNAL INFORMATION

(71) Applicant: Intel Corporation, Santa Clara, CA (US)

(72) Inventors: Xue Yang, Arcadia, CA (US); Robert A. Colby, Granite Bay, CA (US); Lei Yang, Hillsboro, OR (US); Justin Lipman, Shanghai (CN); Xiaoyong Pan, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,433

(22) PCT Filed: May 21, 2013

(86) PCT No.: PCT/US2013/042041
§ 371 (c)(1),
(2) Date: Dec. 26, 2013

(87) PCT Pub. No.: WO2014/189495
PCT Pub. Date: Nov. 27, 2014

(65) Prior Publication Data
US 2015/0133148 A1    May 14, 2015

(51) Int. Cl.
*H04W 24/00* (2009.01)
*H04W 4/04* (2009.01)
*H04W 24/02* (2009.01)
*G06F 17/30* (2006.01)

(52) U.S. Cl.
CPC ......... *H04W 4/043* (2013.01); *G06F 17/30289* (2013.01); *H04W 24/02* (2013.01)

(58) Field of Classification Search
USPC ....................................................... 455/456.1
See application file for complete search history.

(56) References Cited

U.S. PATENT DOCUMENTS

| | | |
|---|---|---|
| 2008/0161011 A1 | 7/2008 | Babin et al. |
| 2008/0176583 A1 | 7/2008 | Brachet et al. |
| 2009/0181695 A1 | 7/2009 | Wirola et al. |
| 2010/0208711 A1 | 8/2010 | Georgis et al. |

(Continued)

OTHER PUBLICATIONS

International Search Report and Written Opinion received for PCT Patent Application No. PCT/US2013/042041, mailed on Feb. 14, 2014, 12 pages.

*Primary Examiner* — Kwasi Karikari
(74) *Attorney, Agent, or Firm* — Salehi Law Group (57) ABSTRACT

A method of generating wireless signal information includes receiving relative movement data generated by sensors and wireless signal data generated by a wireless signal module at a computing system, the sensors and module for detecting wireless signals located in a portable electronic device (PED). The method further includes generating landmark information at a landmark detection module based on the relative movement data, the sensor data and the wireless signal data. The method further includes generating a plurality of Simultaneous Localization and Mapping (SLAM) estimate locations based on the landmark information and the relative movement data at a SLAM optimization engine. The method further includes assembling a first database of locations and corresponding wireless signal strength and access points. The method further includes generating additional information concerning locations and wireless signal information based on the first database.

25 Claims, 7 Drawing Sheets

(56) References Cited

U.S. PATENT DOCUMENTS

| | | |
|---|---|---|
| 2011/0090081 A1 | 4/2011 | Khorashadi et al. |
| 2013/0080457 A1* | 3/2013 | Narayanan et al. ........... 707/758 |
| 2013/0116968 A1* | 5/2013 | Wirola et al. ................. 702/150 |
| 2013/0162481 A1* | 6/2013 | Parvizi et al. ................. 342/452 |
| 2013/0281111 A1* | 10/2013 | Syrjarinne et al. ......... 455/456.1 |
| 2014/0141803 A1* | 5/2014 | Marti et al. ................. 455/456.2 |
| 2014/0156180 A1* | 6/2014 | Marti et al. ................... 701/423 |

* cited by examiner

SYSTEMS AND METHODS FOR SIMULTANEOUSLY AND AUTOMATICALLY CREATING DATABASES OF WIFI SIGNAL INFORMATION

TECHNICAL FIELD

Embodiments described herein generally relate to the mapping of wireless signal patterns.

BACKGROUND

Deriving accurate indoor location has been an increasingly important topic in the midst of mobile applications blooming. Despite a decade of research and development efforts, enabling indoor location capability remains challenging.

WiFi based indoor location technologies have attracted a lot of attention in the past decade given the wide deployment of WLAN (wireless local area network) infrastructure. There are two major industry efforts that determine locations basing on WiFi signal strength. One camp—such as "SkyHook" or GoogleMap—utilizes trilateration basing on radio propagation model to estimate mobile client distance from the known locations of Access Points (AP) and transmit power. The second camp—such as Ekahau or Qubulus—relies on storing pre-recorded calibration WiFi measurement data ("WiFi fingerprint") so that the locations can be determined through "WiFi fingerprint" matching.

The first ("trilateration") camp requires knowledge of WiFi Access Point locations. Skyhook's AP location database is gathered through "wardriving", where a person drives around searching for WiFi networks. Wardrivers use a WiFi-equipped device together with a GPS (global positioning system) device to record the location of WiFi access point basing on AP proximity and current GPS fix.

The wardriving AP database has large distance error, typically at 10-20 m error range. The inaccurate AP location database is currently the performance limiting factor for the "trilateration" camp, and causes major location accuracy impact to the end user.

The second ("WiFi fingerprint") camp requires generating a pre-calibrated WiFi fingerprint database by sampling the radio signal strength from multiple APs at dense locations, and then derives the location through fingerprint matching at fine location granularity. The common practice at the present time is to have people manually calibrating radio map at dense grid level. State of art technologies still require substantial manual input from users, leading to high deployment cost to generate high quality WiFi fingerprint database. Therefore, it is desirable to have a system and method that provides more accurate WiFi fingerprint and AP databases, while at the same time does not require a high degree of user input.

BRIEF DESCRIPTION OF THE DRAWINGS

FIG. 7b shows an example of a SLAM output database for the path of FIG. 7a.

DETAILED DESCRIPTION OF THE DRAWINGS

Described herein are embodiments of systems and methods for simultaneously and automatically creating databases of WiFi signal information. Although the system described herein is primarily applied to WiFi signals, other signal sources may be analyzed with the system. Similarly, although the system is described in relation to indoor areas, it is thought that it may be useful in any place where fine GPS readings are not available. As will be apparent to those of ordinary skill in the art in light of this disclosure, the systems and methods may be implemented in a variety of computing systems, in many cases including software.

In this disclosure, embodiments of an automatic method to simultaneously create WiFi fingerprint database and AP database is provided. The methods have been implemented and tested and compared with currently available technologies, the proposed methods lead to 10× deployment time reduction in obtaining fine granularity fingerprint database, and it leads to 5× accuracy improvement in obtaining AP location database. Also, almost no user input is needed in order for the system and method to create the fingerprint and AP location databases.

Figure 1:
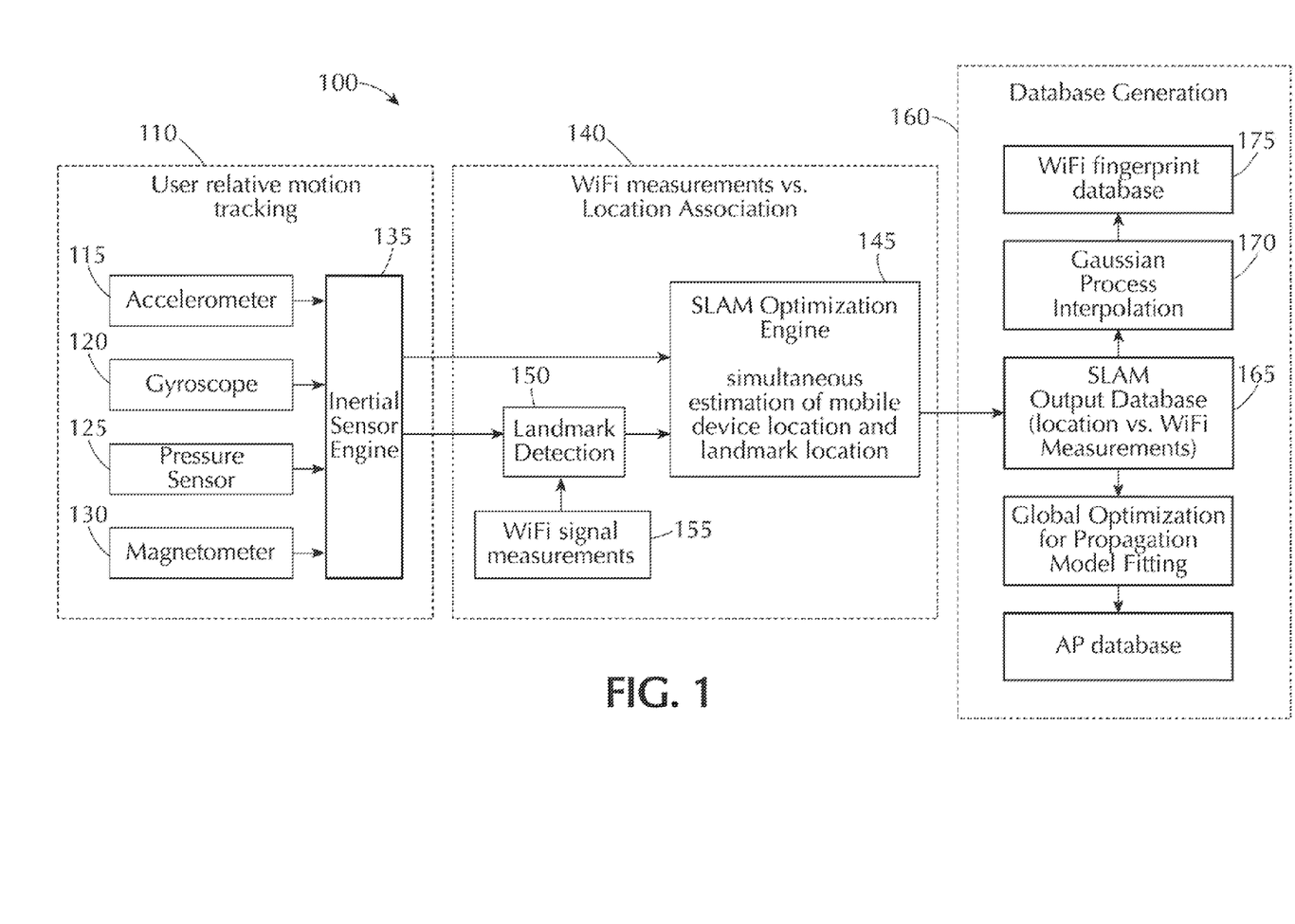
FIG. 1 shows a functional diagram of one embodiment of systems and methods for simultaneously and automatically creating databases of WiFi signal information.

Embodiments of the systems and methods described herein include an innovative approach to simultaneously generate WiFi Fingerprint database and WiFi AP location database. The proposed system 100 provides significantly better accuracy while drastically reducing the time required for system deployment. An example of a function diagram of the proposed approach is shown in FIG. 1 and consists of three major function blocks:

Relative motion tracking 110—The system utilizes inertial sensors (accelerometer 115, gyroscope 120, magnetometer 130, pressure sensor 125) and an inertial sensor engine 135 to track the relative motion of a user as the user carrying a mobile device walks around during deployment process. Existing state of the art MEMs inertial sensor dead reckoning may not be able to accurately predict movement beyond 1 minute. In many of the embodiments described, however, the system uses inertial sensor dead reckoning to drive the coarse estimation of user relative motion, and then mitigates the accumulated errors using SLAM (Simultaneous Localization and Mapping) optimization at later steps. The resulting system can accurately track the relative motion for more than 30 minutes.

WiFi measurements vs. location association 140—SLAM optimization and accurate virtual landmark detection that recognizes a set of unique landmark features within the environment effectively removes inertial sensor dead reckoning errors. SLAM optimization and accurate virtual landmark detection results in an accurate position (i.e., less than 1 meter error) for the associated WiFi scanning result where the scan is made, while the user walks around the environment. In some alternatives, the device measuring positions and signals need not be carried by a user and a mechanical device may carry the device. This part of the system includes a SLAM optimization engine 145, a landmark detection engine 150, which receives location information from the relative motion tracking module 110 and WiFi signal measurements module 155.

Fingerprint database and AP location database generation 160—After the SLAM optimization, a dense set of WiFi scan results and the associated scanning locations along paths the user has walked (SLAM Output Database 165) are available. Based on these more accurate readings, Gaussian Process Interpolation 170 further predicts WiFi fingerprint 175 for all other locations not lying on the paths walked by the user. If the set of WiFi scan results and the associated scanning locations was less accurate, the interpolation would likely be much less useful. Meanwhile, based on the same SLAM Output Database 165, an AP database 185 of AP locations with high fidelity may be reversely trilaterated using Global Optimization for Propagation Model Fitting module 185.

Some innovations from various embodiments are:

No manual user input is required during system deployment, while known existing solutions require user input to label ground truth locations. This is achieved through the combination of inertial sensor dead reckoning, virtual landmark detection and SLAM (Simultaneous Localization and Mapping) optimization. The system can automatically and accurately (i.e., less than 1 meter error) associate each WiFi scan result with the corresponding location where the scan is made.

The system is resilient to inertial sensor errors. Existing start of the art MEMs inertial sensor dead reckoning may not be able to reliably provide movement tracking beyond 1 minute's continuous use. The proposed approach, however, can effectively remove inertial sensor dead reckoning errors and accurately track relative motion for more than 30 minutes.

The proposed approach can simultaneously generate two databases, WiFi fingerprint database and AP location database, through one deployment procedure, while none of the known existing solutions have both databases. All existing solutions either operate on fingerprint database, or operate on AP locations.

Beyond the application for generating fingerprint and AP database for indoor location systems, the proposed approach has additional security and asset management applications as described below:

Rogue AP Detection—The proposed approach can be used by IT administrators and public/private database vendors to proactively or reactively identify rogue APs. A rogue AP's location in a database may be incorrect due to human errors or due to malicious hacking, which can severely affect the performance of location determination methods.

Asset Management—Embodiments of the system can be easily extended to identify and track physical locations of assets. With the wide adoption of wireless technologies, more and more devices are expected to have some form of wireless identifiers (e.g., RFID, Bluetooth, etc.). Data may be collected from devices carried by individuals in an enterprise tasked with walking around (e.g., security staff) or from employees, and the physical locations of the assets may be determined. This would enable automatic and more effective tracking of assets than what is possible today.

The development of a WiFi signature in a building faces many inherent problems. Given a building with WiFi Access Points installed at its surrounding/neighboring area, it is useful to divide the building into grid areas (e.g., 1 meter by 1 meter grid, grid size is variable depending on requirements). A key problem addressed is how to use a mobile device to automatically and simultaneously create a "WiFi fingerprint database" at the granularity of the grid areas and "Access Point database" for all observable Access Points, without relying on any manual effort to label each fingerprint or Access Point with ground-truth location.

Figure 2A:
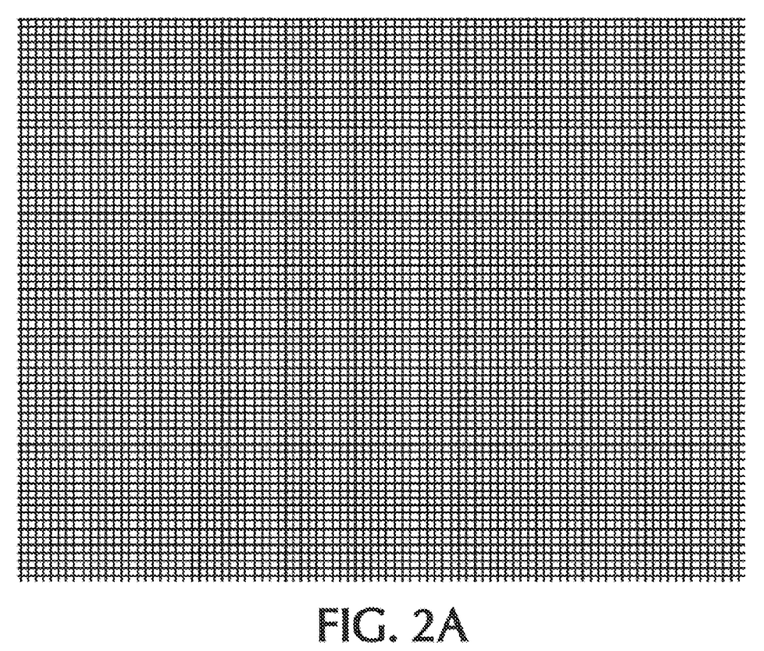
FIG. 2a shows an example of a WiFi fingerprint database.
Figure 2B:
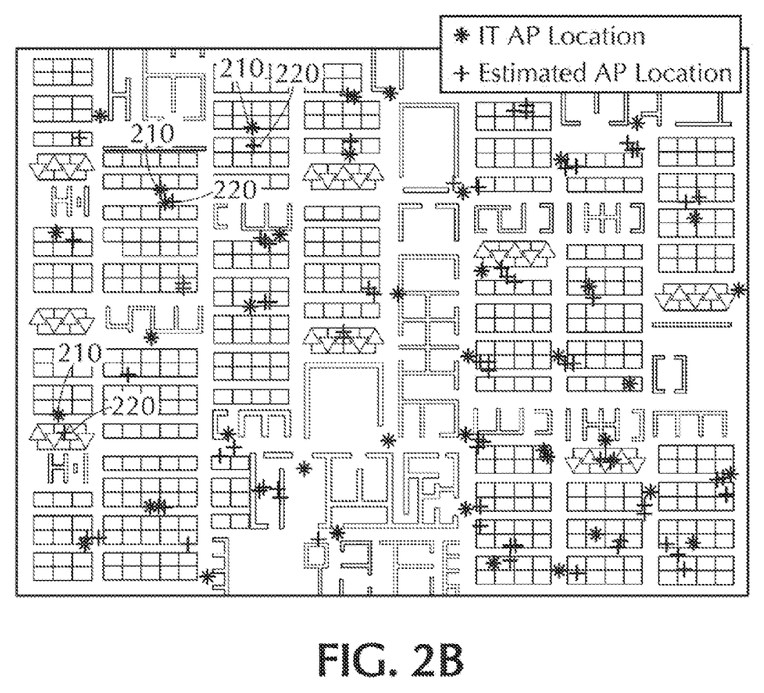
FIG. 2b shows an example of a Access Point Database.

To help visualize the problem, two databases generated by methods described herein are plotted in FIGS. 2a and 2b, the area having a floor area of ~10,000 sq. m. FIG. 2a shows the plotted "WiFi fingerprint database", where each dot corresponds to one database entry consisting of location (X, Y) (and since the entire area is "fingerprinted" the block is full of dots) and a vector of WiFi RSSI measurements at this location ($RSSI_1, RSSI_2, \ldots RSSI_k$) for K Access Points. FIG. 2b shows the plotted WiFi AP database, where "star" 210 indicates the ground truth AP locations, and "cross" 220 indicates the AP locations estimated using the methods herein.

Deployment Methodology—Building a WiFi fingerprint database and AP database is a goal of indoor location system deployment. In one embodiment, to start the deployment, it is necessary to know the user's starting position. This can be accomplished manually (by tapping the map once when the system is being started), or through some other automated location indicator (such as confirmed GPS location, or some form of location tag). After the system is started, the user will walk around the intended (indoor location) deployment area inside the building for at least 2 repeated loops. The algorithm will then process the sensor and radio data collected during user walking to automatically generate "WiFi fingerprint database" and "WiFi AP database".

Algorithm and Function Blocks

In reference to FIG. 1, the user relative motion tracking module 110 includes various means for dead reckoning. As the user carrying mobile device walks around during the deployment process, inertial sensors (accelerometer 115, gyroscope 120, magnetometer 130, pressure sensor 125) are used to track the relative motion of the user. The inertial sensor dead reckoning engine 135 used by the proposed method is described in FIG. 3, and includes three major functions: the first is to track the distance of movements; the second is to track the orientation of movements; and the third is to track the altitude change of the user to determine which floor level the user is on. A "pedometer approach" is used, based on accelerometer measurements to track moving distance. When a person walks, his or her feet alternate between a stationary stance phase and a moving stride phase. By detecting the up and down patterns of the accelerometer measurements, the steps taken by the person can be detected. The movement distance is determined by aggregating individual steps. To track the motion orientation, accelerometer, gyroscope and magnetometer are often used together. A gyroscope measures the angular rotation rate of the mobile device along 3 axes. By integrating gyroscope measurement over time, the orientation change of the user can be tracked. Accelerometer and magnetometer provide reference orientations (gravity and earth magnetic north) to correct gyroscope errors when applicable. The pressure sensor is used to track the relative air pressure change in order to derive the altitude change of the user.

Low cost MEMs sensors commonly used by consumer mobile devices may have inherent sensor error drifting and large sensor measurement noise. As a result, if inertial sensors are used alone, it may be difficult to achieve accurate tracking of mobile device movements over a significant period of time. Typical state of art inertial sensor dead reckoning solutions cannot operate in standalone mode for more than 1 minute. Embodiments of the system described herein include the use of inertial sensor dead reckoning to drive the coarse estimation of user relative motion and SLAM optimization at later steps to mitigate the accumulated errors. The resulting system can reliably track the relative motion for more than 30 minutes.

Figure 3:
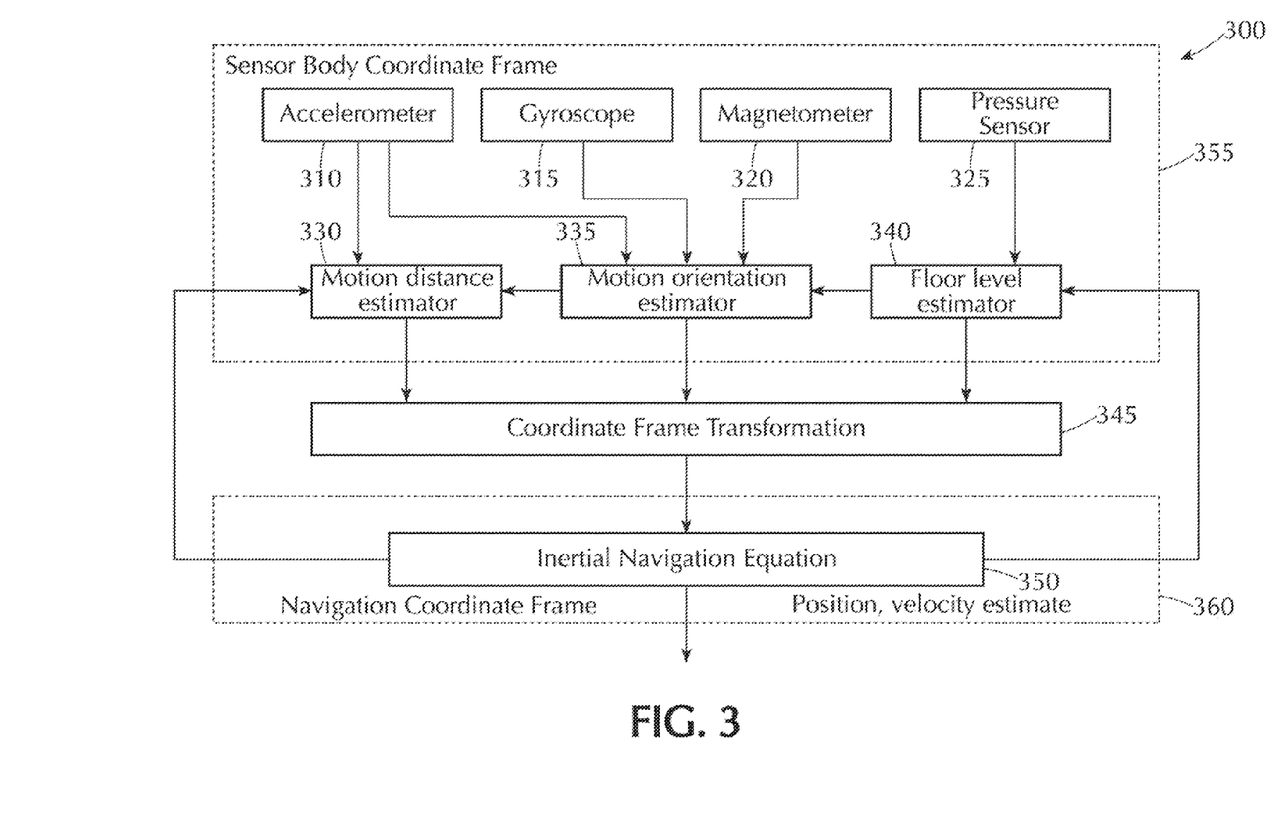
FIG. 3 shows one embodiment of an inertial sensor dead reckoning engine.

FIG. 3 shows the relationship that may be setup between various sensors and position estimation modules. Here an embodiment of an inertial sensor dead reckoning engine 300 is shown. Inertial sensor dead reckoning engine 300 includes accelerometer 310, gyroscope 315, magnetometer 320, and pressure sensor 325, as sensors that provide raw data to the system. In order to estimate distance, motion distance estimator 330 may receive data from accelerometer 310, motion orientation estimator 335 and inertial navigation equation 350. In order to estimate the orientation or direction of movement, motion orientation estimator module 335 may receive input from floor level estimator 340, accelerometer 310, gyroscope 315, and magnetometer 320. In order to estimate the floor level, floor level estimator module 340 may receive input from internal navigation equation 350 and pressure sensor 325. The three modules 330, 335, 340 output to the coordinate frame transformation module 345, which translates the information from the sensor body coordinate frame 355 into the navigation coordinate frame 360. This information is then output to the inertial navigation equation 350 which assists in determining the position and velocity.

Landmark Detection Module 150 uses a perception process to identify a set of unique landmark features within the environment. In some configurations, virtual landmarks are used instead of physical landmarks, where each virtual landmark is represented by a combined set of sensor and radio signal measurements. For example, a set of WiFi signal measurements from multiple access points can be used to identify a virtual landmark; the intersection of two paths can be used as a virtual landmark; a heavy metal door with substantial magnetic distortion can be used as another virtual landmark. The function of landmark detection module is to recognize virtual landmarks present in the environment and associate each virtual landmark with estimated locations basing on inertial sensor dead reckoning output.

SLAM optimization engine 145 works based on the results from inertial sensor dead reckoning module 110 and landmark mark detection modules 150. SLAM global optimization is used to perform trajectory optimization so that the location error from inertial sensor dead reckoning can be corrected and the WiFi measurements corresponding to each location can be identified. Intuitively speaking, if the same virtual landmark identified by the landmark detection module, say $\Omega$, has been estimated at two different locations, say (x1, y1) and (x2, y2), by the inertial sensor dead reckoning, SLAM optimization will pull (x1, y1) and (x2, y2) together, and apply corrections to adjust all other location estimations. In the end, the SLAM engine produces a converged trajectory, which corrects the inertial sensor dead reckoning errors and establishes the correspondence between WiFi scanning results and the corresponding locations where the scans were made.

In practical deployment, the system has been tested for operating on inertial sensor dead reckoning for over 30 minutes using standard off the shelf mobile devices (e.g., Samsung Galaxy Tab. Lenovo K800, Google Nexus 4).

SLAM output database: location vs. WiFi measurement— the structure of the SLAM output database is illustrated in Table 1 below, where each fingerprint entry consists of the fingerprint location, and the corresponding K WiFi measurements (K is the total number of WiFi access points). Each WiFi measurement is denoted by the mean $q_i^k$ and variance $\partial_i^k$ of RSSI (receiving signal strength) associated with the $i^{th}$ database entry and the $k^{th}$ Access Point.

TABLE 1

Structure of SLAM output database: location vs. WiFi measurements.

| Fingerprint location | WiFi fingerprint (RSSI mean, variance) | | | |
|---|---|---|---|---|
| $(X_i, Y_i)$ | Access Point 1 $(q_i^1, \partial_i^1)$ | Access Point 2 $(q_i^2, \partial_i^2)$ | ... | Access Point K $(q_i^K, \partial_i^K)$ |

Gaussian Process Interpolation may be used to generate WiFi fingerprint database covering all floor area. Given the SLAM output database that consists of locations along the paths walked by the user and their corresponding WiFi measurements, embodiments of the method further use Gaussian Process prediction to generate WiFi fingerprint for all other locations not lying on the paths walked by the user. In particular, let $\Gamma = \{\Gamma_1, \Gamma_2, \ldots, \Gamma_n\}$ be the SLAM output database with n entries (i.e., with n locations and its corresponding WiFi measurements). An interpolated database D based on $\Gamma$ is created.

$$D = \{\Gamma_1, \Gamma_2, \ldots, \Gamma_n, \Gamma_{n+1}^A, \Gamma_{n+2}^n, \ldots, \Gamma_N^A\} \quad \text{Eq. (1)}$$

Where $\Gamma 1, \Gamma 2, \ldots, \Gamma n$ is the same as that in $\Gamma$ and $\Gamma_{n+1}^A$, $\Gamma_{n+2}^A, \ldots, \Gamma_N^A\}$ are predicted using Gaussian Process for rest of grid areas not lying on the paths (called unobserved grid areas) walked by the user. More specifically, given an unobserved grid area i and its corresponding location $pos_i = (x_i, y_i)$, the mean and variance of the RSSI at the unobserved grid area I is calculated as:

$$q_1 = k_i^T (K + \sigma 1)^{-1} y \quad \text{Eq. (2)}$$

$$\Gamma_1 = k(pos_i, pos_i) - k_i^T (K + \sigma 1)^{-1} k_i \quad \text{Eq. (3)}$$

Here $k_i$ is the n×1 covariance vector between $pos_i$ and the n known entries in $\Gamma$, y is the WiFi signal mean of the n known entries in $\Gamma$ and K is the covariance matrix among the n known entries in $\Gamma$. Both $k_i$ and K can be calculated from Gaussian Process kernel. The resulting "WiFi fingerprint database" from Gaussian Process prediction has the same structure as that described in Table 1, with more database entries than SLAM output database to cover the entire floor area (not just the paths walked by the user).

Using propagation model fitting to generate AP database—Given the SLAM output database that consists of locations along the paths walked by the user and their corresponding WiFi measurements, embodiments of the method also use propagation model fitting to generate AP database. In particular, let $\Gamma = \{\Gamma_1, \Gamma_2, \ldots, \Gamma_n\}$ be the SLAM output database with n entries. Each entry $\Gamma_i$ consists of the fingerprint location $(X_i, Y_i)$, and K WiFi measurements corresponding to K total APs. Each WiFi measurement has the mean $q_i^k$ of RSSI associated with the $i^{th}$ database entry and the $k^{th}$ Access Point.

Different WiFi radio propagation model can be applied to our proposed method. For our prototype implementation, we used a Direct Ray Model, where the path loss equation takes the following form:

$$PathLoss = 10 \times n \times \log_{10}\left(\frac{d}{d_o}\right) + 20 \times \log_{10}\left(\frac{4\pi d_o}{\lambda}\right) \quad \text{Eq. (4)}$$

Where n is the path loss exponent, d is the distance from the AP to the mobile device, $d_o$ is the reference distance, $\lambda$ is the radio wavelength.

Given the WiFi AP transmission power $P_{tx}$, the receiving power $P_{rx}$ can be obtained as $$P_{rx} = P_{tx} - PathLoss = P_{tx} - 20 \times \log_{10}\left(\frac{4\pi d_o}{\lambda}\right) - 10 \times n \times \log_{10}\left(\frac{d}{d_o}\right) \quad \text{Eq. (5)}$$

Let $$P_{ref} = P_{tx} - 20 \times \log_{10}\left(\frac{4\pi d_o}{\lambda}\right)$$

and $d_o = 1$ meter. Equation (5) can be further simplified as $$P_{rx} = P_{ref} - 10 \times n \times \log_{10}(d) \quad \text{Eq. (6)}$$

where $P_{ref}$ represents the signal level at the reference distance 1 meter.

For a given AP k, the goal is to estimate its power level ($P_{ref}^k$), the path loss exponent ($n^k$), and the location of the AP ($AP_x^k, AP_y^k$). Recall that each entry $\Gamma_i$ of SLAM output database consists of its location ($X_i, Y_i$), and the corresponding WiFi measurement signal levels observed ($q_i^1, q_i^2, \ldots, q_i^k$) for all K APs. The WiFi signal level of each location may be estimated based on a radio propagation model. The optimal AP parameters can be found by minimizing the mean square error between the estimated WiFi signal levels and the actual WiFi measurement signal levels across all n entries of SLAM output database.

More specifically, given entry $\Gamma_i$ from the SLAM output database, its estimated receiving signal strength from the kth AP is written as:

$$p_{rx\_i}^k = P_{ref}^k - 10 \times n^k \times \log_{10}(\text{sqrt}((x_i - AP_x^k) + ((y_i - AP_y^k)^2)) \quad \text{Eq. (7)}$$

The optimization objective function for the kth AP is then defined as $$f^k = \frac{1}{n}\sum_{i=1}^{n} (p_{rx\_i}^k - q_i^k)^2 \quad \text{Eq. (8)}$$

By finding the values of $P_{ref}^k, n^k, AP_x^k, AP_y^k$ that minimizes $f^k$, the optimal parameter estimation for the $k_{th}$ AP is obtained.

Repeating the propagation model fitting procedure (Eq. (7) and Eq. (8)) for each AP results in the AP database consisting of power level ($P_{ref}^k$), the path loss exponent ($n^k$), and the location of the AP ($AP_x^k, AP_y^k$) for all observable APs.

Results:

The following illustrates an example of the system using deployment results is shown.

Figure 4:
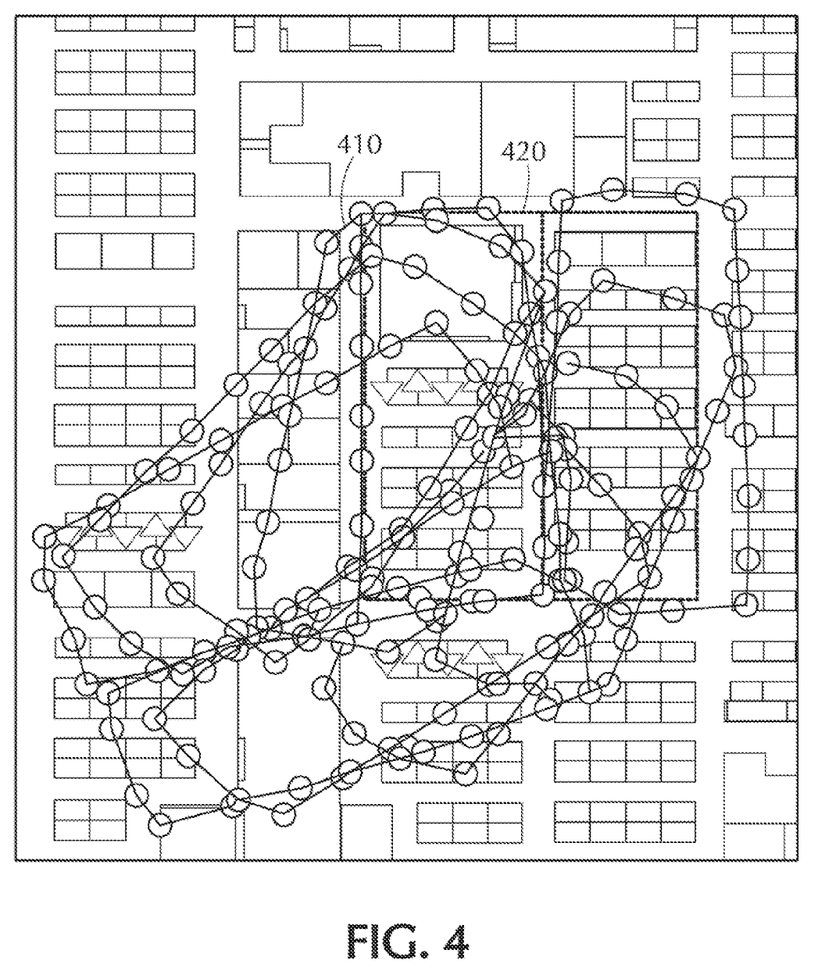
FIG. 4 shows an example of output from a user relative motion tracking module.

Output from "user relative motion tracking module"—The curves 410 in FIG. 4 show the example of inertial sensor dead reckoning output when user walk around the marked path 420 for 4 loops. As shown in FIG. 4, the inertial dead reckoning has large errors in estimating the location, and the error grows in time. Embodiments of the method can well tolerate the inertial dead reckoning errors.

Figure 5:
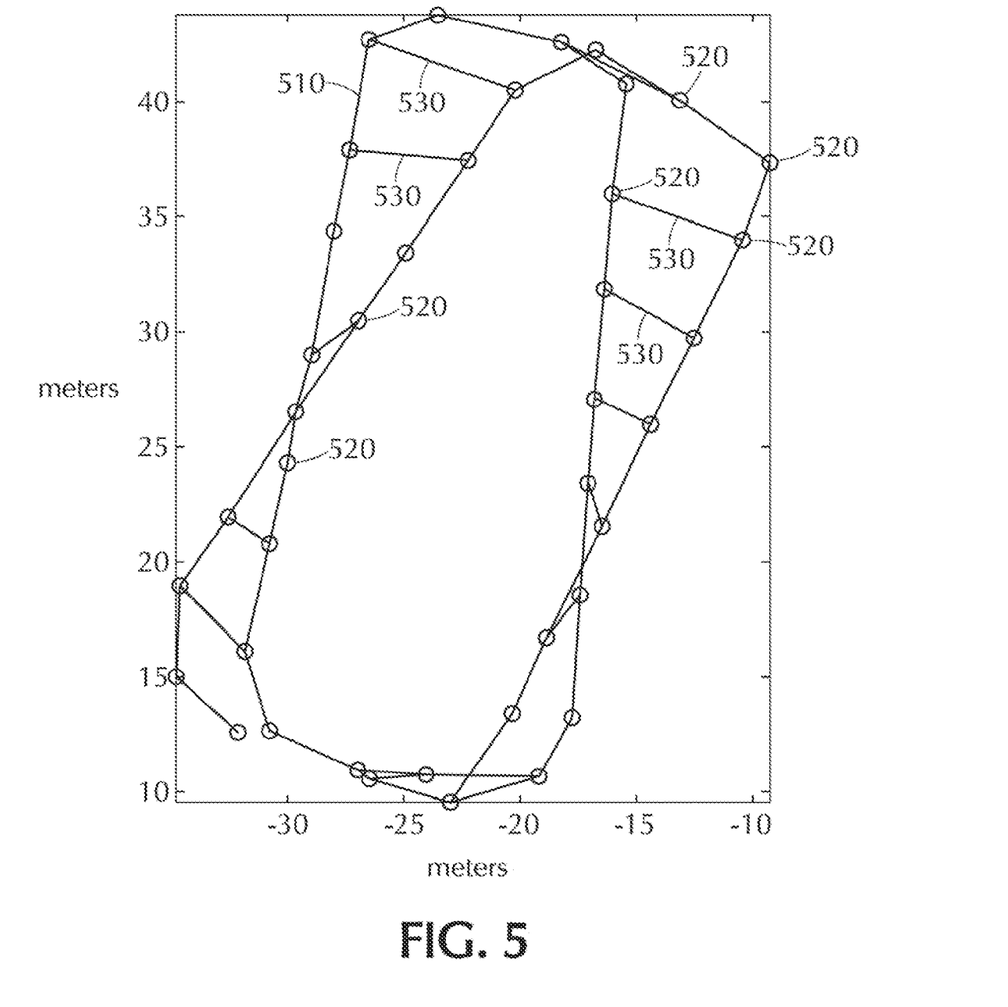
FIG. 5 shows an example of output from a landmark detection module.

Landmark Detection Module—FIG. 5 shows the output of landmark detection module. The curve 510 is again the output from inertial sensor dead reckoning; the circles 520 represent the identified virtual landmarks, and the two ends of the curve 530 connect the same virtual landmark 520 that has been estimated at two different locations by the inertial sensor dead reckoning.

Figure 6:
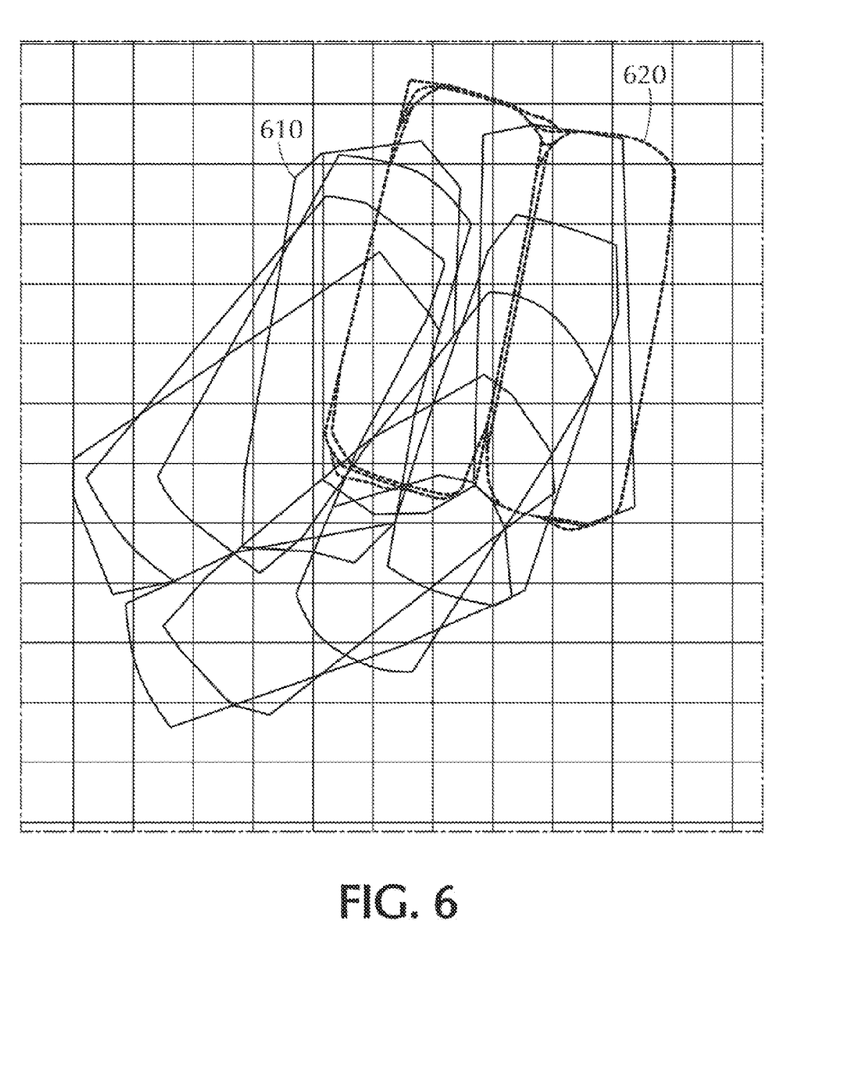
FIG. 6 shows an example of a Simultaneous Localization and Mapping (SLAM) converged output of a path of travel.

Output of SLAM optimization engine—FIG. 6 shows the SLAM converged output for the same dead reckoning trace shown in FIG. 4. Again, the curves 610 in FIG. 6 corresponds to the output of inertial sensor dead reckoning, while curve 620 shows the SLAM converged output that has corrected the accumulated errors from inertial sensor dead reckoning.

Figure 7A:
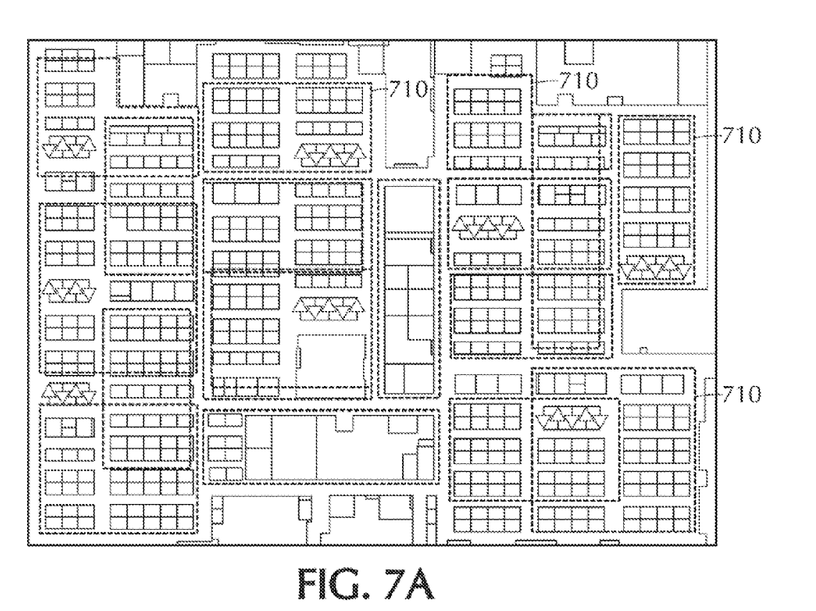
FIG. 7a shows an example of true ground paths walked by a user.
Figure 7B:
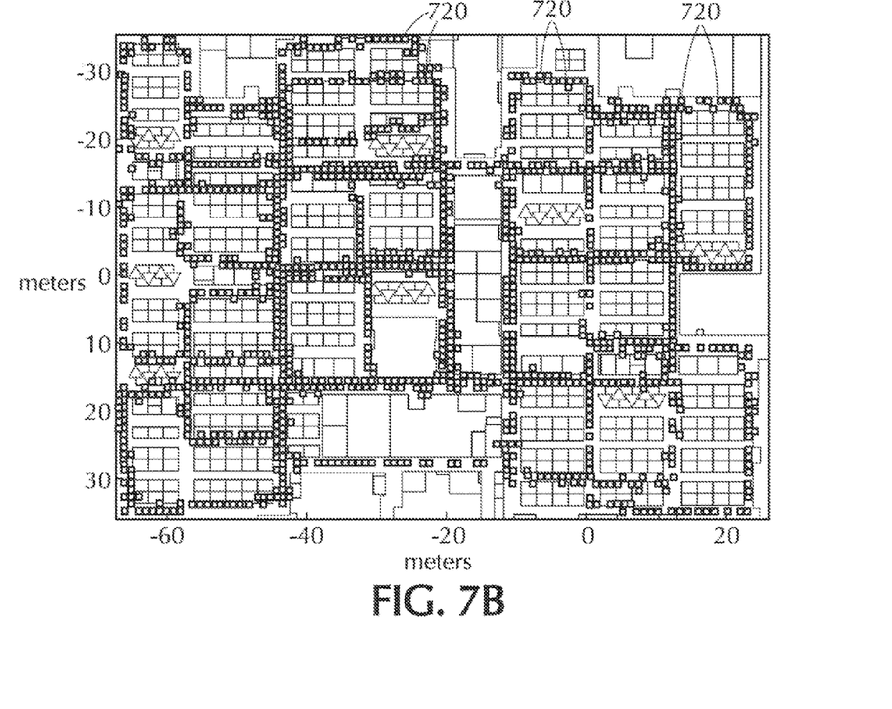

SLAM output database—FIG. 7b shows the SLAM output database. The ground truth paths 710 walked by user are shown in FIG. 7a, and the SLAM converged output database 720 is shown in FIG. 7.b.

WiFi fingerprint database from Gaussian Process prediction—FIG. 2a shows the WiFi fingerprint database generated from FIG. 7b using Gaussian Process interpolation. To verify the quality of the WiFi fingerprint database, the WiFi signal was tested at 16 locations. The average error of mobile client fingerprint matching locations using the generated WiFi fingerprint database is 2.2 m, which is comparable to the mobile client locations obtained using manually surveyed fingerprint database (average error 1.63 m).

AP database from propagation model fitting—FIG. 2b shows the plotted the WiFi AP database obtained using the proposed method, where "star" 210 indicates the ground truth AP locations and "cross" 220 indicates the AP locations estimated using our proposed method. Notice that there are multiple crosses 220 overlaid on top of each other. This is because one physical AP corresponds to multiple virtual APs; each virtual AP having a different MAC (media access control) address. Each "cross" corresponds to one virtual AP, while each "star" corresponds to one physical AP. Compared with the ground truth AP locations, the average error of AP locations estimated using our proposed method is 3.3 m, which is a significant improvement over the wardriving AP database (10-20 meter error).

In one embodiment, a method of generating wireless signal information includes receiving relative movement data generated by sensors and wireless signal data generated by a wireless signal module at a computing system, the sensors and module for detecting wireless signals located in a portable electronic device (PED). The method further includes generating landmark information at a landmark detection module based on the relative movement data and the wireless signal data. The method further includes generating a plurality of SLAM estimate locations based on the landmark information and the relative movement data at a Simultaneous Localization and Mapping (SLAM) optimization engine. The method further includes assembling a first database of locations and corresponding wireless signal strength and access points. The method further includes generating additional information concerning locations and wireless signal information based on the first database. Optionally, the calculating additional information concerning locations and wireless signal information based on the first database includes generating a second database of unknown locations and corresponding wireless signal strengths based on the first database; and generating a third database of access point locations based on the first database. In one configuration, the wireless signal data is signal data concerning WiFi signals. In one alternative, the sensors are inertial dead reckoning sensors and the sensors include an inertial sensor engine that receives signals from the are inertial dead reckoning sensors to use in determining relative movement data. Optionally, the inertial sensor engine includes a motion distance estimator, a motion orientation estimator, floor level estimator, coordinate frame transformation module, and an inertial navigation equation. In one embodiment, the method further includes comparing the third database with a database of known access points to determine rouge access points. Optionally, the method further includes comparing the third database with a database of known equipment to determine the location of known equipment. In one alternative, the method includes traversing an area with the PED, the area having poor GPS reception. Optionally, the unknown locations are locations near a path of travel through the area. Alternatively, the area is a complex of buildings. In another alternative, the area is a building. Optionally, the generating of the second database includes the use of Gaussian process interpolation to generate the unknown locations and corresponding wireless signal strengths and the unknown locations are locations near an area surveyed for wireless signal strength. Alternatively, the generating of the third database includes using propagation model fitting. Optionally, the traversing an area includes a user carrying the PEE) along a set path. In one configuration, the user traverses the set path multiple times. In another configuration, no user input is required during the traversing.

In one embodiment, a system for generating wireless signal information includes a portable electronic device (PED), the PED including sensors for detecting the movement of the PED and a wireless signal module for detecting wireless signals. The system further includes a computing system receiving data from the sensors and the module for detecting wireless signals. The computing system is configured to: receive relative movement data generated by the sensors and wireless signal data generated by the wireless signal module and provide the relative movement data to a Simultaneous Localization and Mapping (SLAM) optimization engine. The computing system is further configured to provide the relative movement data, the sensor data and the wireless signal data to a landmark detection module and generate landmark information at the landmark detection module based on the relative movement data, the sensor data and the wireless signal data. The computing system is further configured to provide landmark information to the SLAM optimization engine and generate a plurality of SLAM estimate location based on the landmark information and the relative movement data. The computing system is further configured to generate a first database of locations and corresponding wireless signal strength and access points and generate a second database of unknown locations and corresponding wireless signal strength and access points based on the first database. The computing system is further configured to generate a third database of access point locations based on the first database.

In another embodiment, a system for generating wireless signal information includes a computing system receiving data from sensors and a module for detecting wireless signals, the sensors and module for detecting wireless signals located in a portable electronic device (PED). The computing system is configured to receive relative movement data generated by the sensors and wireless signal data generated by the wireless signal module and generate landmark information at a landmark detection module based on the relative movement data, the sensor data and the wireless signal data. The computing system is further configured to generate a plurality of SLAM estimate locations based on the landmark information and the relative movement data at a Simultaneous Localization and Mapping (SLAM) optimization engine and assemble a first database of locations and corresponding wireless signal strength and access points. The computing system is further configured to generate additional information concerning locations and wireless signal information based on the first database. Optionally, the computing system is further configured to generate a second database of unknown locations and corresponding wireless signal strengths based on the first database, as part of the generation of additional information concerning locations and wireless signal information; and generate a third database of access point locations based on the first database, as part of the generation of additional information concerning locations and wireless signal information. In one alternative, the wireless signal data is signal data concerning WiFi signals. In another alternative, the sensors are inertial dead reckoning sensors and the sensors include an inertial sensor engine that receives signals from the are inertial dead reckoning sensors to use in determining relative movement data. Optionally, the inertial sensor engine includes: a motion distance estimator, a motion orientation estimator, floor level estimator, coordinate frame transformation module, and an inertial navigation equation. Alternatively, the computing system uses Gaussian process interpolation to generate the unknown locations and corresponding wireless signal strengths and the unknown locations are locations near an area surveyed for wireless signal strength. Optionally, the computing system uses propagation model fitting to generate the third database. In one configuration, the system is configured to generate the addition information without user input. Optionally, the system is configured to generate the addition information based on a user traversing an area carrying the PED along a set path. In another configuration, the user traverses the set path multiple times. Optionally, no user input is required during the traversing. Alternatively, the computing system is located in the PED. In one alternative, the computing system is remote from the PED. In another alternative, the computing system is a distributed computing system.

In this disclosure, although the sensors used are typically deployed in the electronic device carried by the user when the user traverses a path, the systems that process the data from the sensors may be located in the same electronic device, in a remote electronic device that the first electronic devices communicates with, or in a cloud computing/distributed processing arrangement. Therefore, when a computing device is referred to, it encompasses devices that are part of the electronic device including the sensors, devices that are remote from the electronic device including the sensors, and cloud computing/distributed processing types of systems. The computing device need not be separate from the electronic device including the sensors and alternatively, it need not be collocated with the electronic device including the sensors.

The previous detailed description is of a small number of embodiments for implementing the systems and methods for simultaneously and automatically creating databases of WiFi signal information and is not intended to be limiting in scope. The following claims set forth a number of the embodiments of the systems and methods for systems and methods for simultaneously and automatically creating databases of WiFi signal information disclosed with greater particularity.

What is claimed:

1. A method of generating wireless signal information, the method comprising:
  receiving relative movement data generated by sensors and wireless signal data generated by a wireless signal module at a computing system, the sensors and module for detecting wireless signals located in a portable electronic device (PED);
  generating landmark information at a landmark detection module based on the relative movement data, sensor data and the wireless signal data;
  generating a plurality of SLAM estimate locations based on the landmark information and the relative movement data at a Simultaneous Localization and Mapping (SLAM) optimization engine;
  assembling a first database of locations and corresponding wireless signal strength and access points; and generating additional information concerning locations and wireless signal information based on the first database.

2. The method of claim 1, wherein the calculating additional information concerning locations and wireless signal information based on the first database includes:
generating a second database of unknown locations and corresponding wireless signal strengths based on the first database; and
generating a third database of access point locations, transmission power and corresponding path loss coefficient based on the first database.

3. The method of claim 1, wherein the wireless signal data is signal data concerning WiFi signals.

4. The method of claim 1, wherein the wireless signal data is signal data of any radio module at a computing system.

5. The method of claim 1, wherein the sensors are MEMs sensors at a computing system.

6. The method of claim 5, wherein the MEMs sensors include an accelerometer, gyroscope, magnetometer, and pressure sensor.

7. The method of claim 5, wherein the sensors are used to track user relative motion using dead reckoning methods.

8. The method of claim 5, wherein the sensors are also used for landmark detection.

9. The method of claim 1, wherein the sensors are inertial dead reckoning sensors and the sensors include an inertial sensor engine that receives signals from the inertial dead reckoning sensors to use in determining relative movement data.

10. The method of claim 9, wherein the inertial sensor engine includes:
a motion distance estimator, a motion orientation estimator, floor level estimator,
coordinate frame transformation module, and an inertial navigation equation.

11. The method of claim 2, further comprising:
comparing the third database with a database of known access points to determine rogue access points.

12. The method of claim 2, further comprising:
comparing the third database with a database of known equipment to determine the location of known equipment.

13. The method of claim 2, further comprising:
traversing an area with the PED, the area having poor GPS reception.

14. The method of claim 13, wherein the unknown locations are locations near a path of travel through the area.

15. The method of claim 13, wherein the traversing an area includes a user carrying the PED along a set path.

16. The method of claim 2, wherein the generating of the second database includes the use of Gaussian process interpolation to predict wireless signal strengths for the unknown locations and the unknown locations are locations near an area surveyed for wireless signal strength.

17. A system for generating wireless signal information, the system comprising:
a portable electronic device (PED), the PED including sensors for detecting the movement of the PED and a wireless signal module for detecting wireless signals;
a computing system receiving data from the sensors and the module for detecting wireless signals, the computing system configured to:
receive relative movement data generated by the sensors and wireless signal data generated by the wireless signal module;
provide the relative movement data to a Simultaneous Localization and Mapping (SLAM) optimization engine;
provide the relative movement data, the sensor data and the wireless signal data to a landmark detection module;
generate landmark information at the landmark detection module based on the relative movement data, the sensor data and the wireless signal data provide landmark information to the SLAM optimization engine;
generate a plurality of SLAM estimate location based on the landmark information and the relative movement data;
generate a first database of locations and corresponding wireless signal strength and access points;
generate a second database of unknown locations and corresponding wireless signal strength and access points based on the first database; and
generate a third database of access point locations based on the first database.

18. A system for generating wireless signal information, the system comprising:
a computing system receiving data from sensors and a module for detecting wireless signals, the sensors and module for detecting wireless signals located in a portable electronic device (PED), the computing system configured to:
receive relative movement data generated by the sensors and wireless signal data generated by the wireless signal module;
generate landmark information at a landmark detection module based on the relative movement data and the wireless signal data;
generate a plurality of SLAM estimate locations based on the landmark information and the relative movement data at a Simultaneous Localization and Mapping (SLAM) optimization engine;
assemble a first database of locations and corresponding wireless signal strength and access points; and
generate additional information concerning locations and wireless signal information based on the first database.

19. The system of claim 18, wherein the computing system is further configured to
generate a second database of unknown locations and corresponding wireless signal strengths based on the first database, as part of the generation of additional information concerning locations and wireless signal information; and
generate a third database of access point locations based on the first database, as part of the generation of additional information concerning locations and wireless signal information.

20. The system of claim 18, wherein the sensors are inertial dead reckoning sensors and the sensors include an inertial sensor engine that receives signals from the inertial dead reckoning sensors to use in determining relative movement data.

21. The system of claim 20, wherein the inertial sensor engine includes:
a motion distance estimator, a motion orientation estimator, floor level estimator, coordinate frame transformation module, and an inertial navigation equation.

22. The system of claim 19, wherein the computing system uses Gaussian process interpolation to generate the unknown locations and corresponding wireless signal strengths and the unknown locations are locations near an area surveyed for wireless signal strength.

23. The system of claim 19, wherein the computing system uses propagation model fitting to generate the third database.

24. The system of claim 19, wherein the system is configured to generate the addition information based on a user traversing an area carrying the PED along a set path.

25. The system of claim 24, wherein no user input is required during the traversing.

* * * * *